(12) United States Patent
Zheng

(10) Patent No.: US 9,569,607 B2
(45) Date of Patent: Feb. 14, 2017

(54) SECURITY VERIFICATION METHOD AND APPARATUS

(71) Applicant: TENCENT TECHNOLOGY (SHENZHEN) COMPANY LIMITED, Shenzhen (CN)

(72) Inventor: Xiaosheng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/102,598

(22) PCT Filed: Jun. 23, 2015

(86) PCT No.: PCT/CN2015/082087
§ 371 (c)(1),
(2) Date: Jun. 8, 2016

(87) PCT Pub. No.: WO2015/196973
PCT Pub. Date: Dec. 30, 2015

(65) Prior Publication Data
US 2016/0314292 A1    Oct. 27, 2016

(30) Foreign Application Priority Data

Jun. 25, 2014  (CN) .......................... 2014 1 0292802

(51) Int. Cl.
*G06F 21/00*  (2013.01)
*G06F 21/36*  (2013.01)
(Continued)

(52) U.S. Cl.
CPC ........... *G06F 21/36* (2013.01); *G06F 17/2705* (2013.01); *G06F 21/57* (2013.01); *G06F 2221/034* (2013.01)

(58) Field of Classification Search
None
See application file for complete search history.

(56) References Cited

U.S. PATENT DOCUMENTS 6,387,447 B1 *  5/2002  Grimm ...................... C08J 9/32
                                                                       427/373
8,732,827 B1     5/2014  Zhukov et al.
(Continued)

FOREIGN PATENT DOCUMENTS

CN    1 02842007 A    12/2012
CN    1 03002342 A    3/2013
(Continued)

OTHER PUBLICATIONS

International Search Report and Written Opinion, International Application No. PCT/CN2015/082087, mailed Sep. 11, 2015.
(Continued)

*Primary Examiner* — Farid Homayounmehr
*Assistant Examiner* — Maung Lwin
(74) *Attorney, Agent, or Firm* — Marshall, Gerstein & Borun LLP

(57) ABSTRACT

A security verification method includes: starting a monitoring process and monitoring a third-party application in an active state in the monitoring process; obtaining identification information of a current interface of the third-party application; determining, according to the identification information, whether the current interface is included in a preset monitoring list; displaying a security verification interface if the current interface is included in the monitoring list, and performing security verification on a user according to interaction between the user and the security verification interface; and displaying the current interface if the security verification succeeds. In addition, the present disclosure further provides a security verification apparatus.

15 Claims, 10 Drawing Sheets

(51) Int. Cl.
*G06F 21/57* (2013.01)
*G06F 17/27* (2006.01)

(56) References Cited

U.S. PATENT DOCUMENTS

| | | | | |
|---|---|---|---|---|
| 2004/0225601 | A1* | 11/2004 | Wilkinson | G06F 21/36 |
| | | | | 705/39 |
| 2007/0294209 | A1* | 12/2007 | Strub | H04L 63/102 |
| 2007/0300077 | A1* | 12/2007 | Mani | G06F 21/32 |
| | | | | 713/186 |
| 2012/0089481 | A1* | 4/2012 | Iozzia | G06F 21/31 |
| | | | | 705/26.41 |
| 2012/0210266 | A1* | 8/2012 | Jiang | H04N 21/233 |
| | | | | 715/772 |
| 2013/0097672 | A1* | 4/2013 | Pathiyal | G06F 21/6218 |
| | | | | 726/3 |
| 2013/0117573 | A1* | 5/2013 | Harbige | G06F 21/31 |
| | | | | 713/183 |
| 2015/0317470 | A1 | 11/2015 | Zheng | |

FOREIGN PATENT DOCUMENTS

| | | |
|---|---|---|
| CN | 103179124 A | 6/2013 |
| CN | 103377332 A | 10/2013 |
| CN | 103856537 A | 6/2014 |

OTHER PUBLICATIONS

Office Action in CN Application No. 201410292802.4 dated Nov. 1, 2016, 7 pages.

* cited by examiner

SECURITY VERIFICATION METHOD AND APPARATUS

CROSS-REFERENCE TO RELATED APPLICATIONS

This application is a 371 U.S. National Phase of International Application PCT/CN2015/082087 filed on Jun. 23, 2015 which claims benefit of and priority to Chinese Patent Application No. 201410292802.4, filed on Jun. 25, 2014. The aforementioned applications are hereby incorporated by reference in their entirety.

FIELD OF THE TECHNOLOGY

The present disclosure relates to computer technologies, and in particular, to a security verification method and apparatus.

BACKGROUND OF THE DISCLOSURE

A mobile device has an independent operating system and independent running space, and allows a user to install applications, such as software, games, and navigation applications, provided by a third party. With the growing popularity of mobile devices, applications can provide an Internet portal on mobile terminals for users so as to meet their demands for consultation, shopping, social networking, entertainment, search and so on. Some applications are not payment applications, but some interfaces in the applications are payment interfaces. Because funds transactions are involved, it is necessary to particularly avoid transaction risks.

In the existing technology, after an application is started, no security verification is set for entering interfaces of the application and security of sensitive information of a user on the interface cannot be protected.

SUMMARY

In view of the above, the present disclosure provides a security verification method and apparatus, which can effectively improve security for entering an interface containing sensitive information.

A security verification method provided by an embodiment of the present invention includes: starting a monitoring process and monitoring a third-party application in an active state in the monitoring process; obtaining identification information of a current interface of the third-party application; determining, according to the identification information, whether the current interface is included in a preset monitoring list; displaying a security verification interface if the current interface is included in the monitoring list, and performing security verification on a user according to interaction between the user and the security verification interface; and displaying the current interface of the third-party application if the user passes the security verification.

A security verification apparatus provided by an embodiment of the present invention includes: a monitoring unit, configured to start a monitoring process and monitor a third-party application in an active state in the monitoring process; an obtaining unit, configured to obtain identification information of a current interface of the third-party application; a determining unit, configured to determine, according to the identification information, whether the current interface is included in a preset monitoring list; and a display unit, configured to display a security verification interface if the current interface is included in the monitoring list, and perform security verification on a user according to interaction between the user and the security verification interface, the display unit being further configured to display the current interface of the third-party application if the user passes the security verification.

In the security verification method and apparatus provided by the embodiments of the present invention, a monitoring process is started to monitor a third-party application in an active state, and if a current interface of the third-party application in the active state is a interface currently being monitored, a security verification interface is displayed to prompt a user to perform security verification, and the current interface is displayed only if the security verification succeeds, thereby enhancing security for entering the current interface.

In order to make the foregoing and other objectives, features, and advantages of the present disclosure more comprehensible, preferred embodiments are described in detail below with the accompanying drawings

DESCRIPTION OF EMBODIMENTS

In order to further explain technical means adopted by the present disclosure for achieving predetermined inventive objectives and effects thereof, specific implementation manners, structures, features, and effects of the present disclosure are explained below in detail with reference to the accompanying drawings and preferred embodiments.

An embodiment of the present invention provides a security verification method, which is applied to a mobile terminal to perform security verification on a user when the user enters a particular interface of an application, and can effectively improve security of sensitive information of the user on the particular interface.

Figure 1:
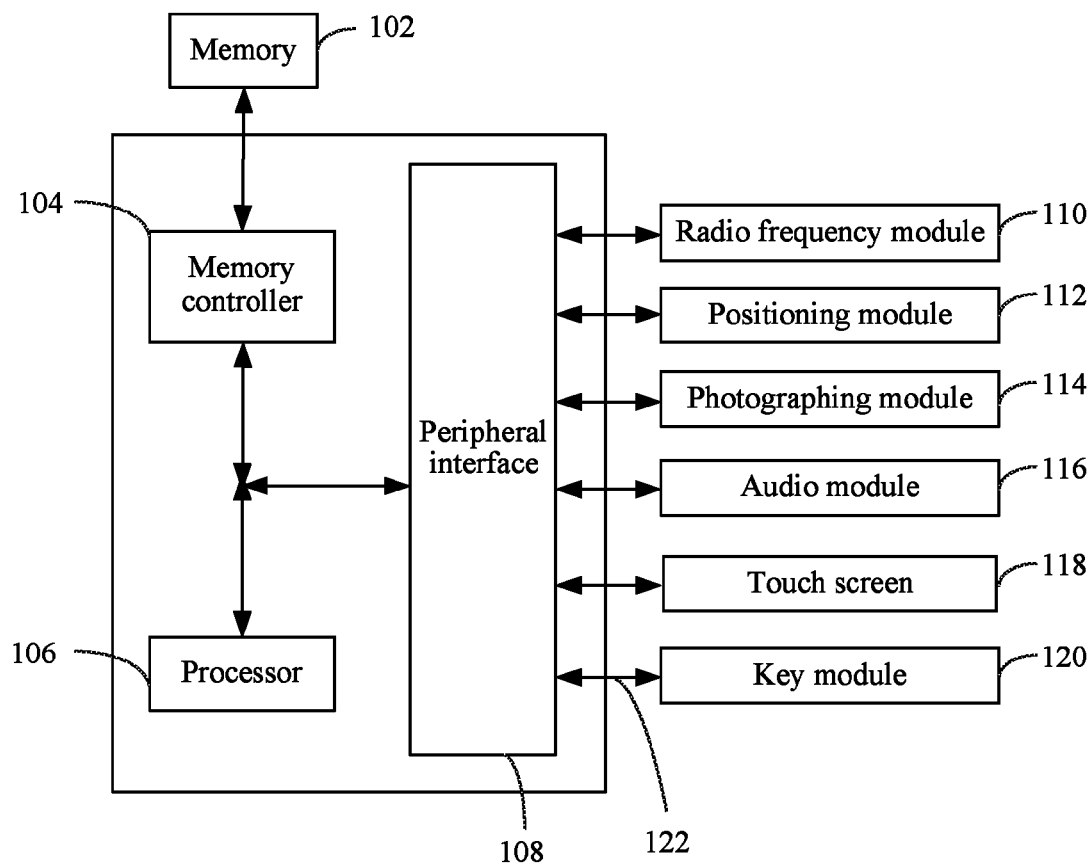
FIG. 1 is a structural block diagram of a mobile terminal.

Referring to FIG. 1, FIG. 1 is a structural block diagram of a mobile terminal. The mobile terminal may be any mobile terminal having a touch screen such as a smart phone, a personal digital assistant, a tablet computer, or a wearable device. As shown in FIG. 1, the mobile terminal 100 includes a memory 102, a storage controller 104, one or more (only one is shown in the drawing) processors 106, a peripheral interface 108, a radio frequency module 110, a positioning module 112, a photographing module 114, an audio module 116, a touch screen 118, and a key module 120. These components communicate with each other through one or more communication buses/signal lines 122.

It may be understood that the structure shown in FIG. 1 is only for the purpose of illustration and is not intended to limit the structure of the terminal 100. For example, the terminal 100 may also include more or fewer components than those shown in FIG. 1, or have a configuration different from that shown in FIG. 1. The components shown in FIG. 1 may be implemented by using hardware, software, or a combination thereof.

The memory 102 may be configured to store a software program and a module, for example, a program instruction/module corresponding to a security verification method and apparatus in the terminal device in the embodiments of the present inventions, and the processor 102 runs the software program and module stored in the memory 104 to implement various functional applications and data processing, that is, implementing the foregoing security verification method.

The memory 102 may include a high-speed random access memory, and may also include a nonvolatile memory, for example, one or more magnetic storage devices, flash memories or other nonvolatile solid-state memories. In some embodiments, the memory 102 may further include memories remotely disposed relative to the processor 106, and these remote memories may be connected to the terminal device 100 through a network. Examples of the network include, but are not limited to, the Internet, an intranet, a local area network, a mobile communications network, or a combination thereof. The processor 106 and other possible components may access the memory 102 under the control of the memory controller 104.

The peripheral interface 108 couples various input/output devices to a CPU and the memory 102. The processor 106 runs various software and instructions inside the memory 102, so as to perform various functions of the terminal device 100 and perform data processing.

In some embodiments, the peripheral interface 108, the processor 106, and the memory controller 104 may be implemented in a single chip. In some other embodiments, they may be separately implemented by an independent chip.

The radio frequency module 110 is configured to receive and send an electromagnetic wave, and implement mutual conversion between the electromagnetic wave and an electric signal, so as to communicate with a communications network or another device. The radio frequency module 110 may include various existing circuit elements for performing these functions, such as an antenna, a radio frequency transceiver, a digital signal processor, a cipher/decipher chip, a subscriber identity module (SIM) card, and a memory. The radio frequency module 110 may communicate with various networks such as the Internet, an intranet and a wireless network, or communicate with other devices through a wireless network. The wireless network may include a cellular telephone network, a wireless local area network, or a metropolitan area network. The wireless network may use various communications standards, protocols and technologies, which include, but are not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (WiFi) (for example, US Institute of Electrical and Electronic Engineers IEEE 802.11a, IEEE 802.11b, IEEE 802.11g and/or IEEE 802.11n), Voice over Internet Protocol (VoIP), Worldwide Interoperability for Microwave Access (Wi-Max), other protocols for email, instant messaging and short message service, and any other suitable communications protocols, and even may include some protocols that have not been developed.

The positioning module 112 is configured to acquire a current location of the terminal device 100. Examples of the positioning module 112 include, but are not limited to, a Global Positioning System (GPS) and a positioning technology based on a wireless local area network or mobile communications network.

The camera module 114 is configured to capture a picture or video. The captured picture or video may be stored in the memory 102, and may be sent by using the radio frequency module 110.

The audio module 116 provides an audio interface for a user, and may include one or more microphones, one or more loudspeakers, and an audio circuit. The audio circuit receives audio data from the peripheral interface 108, converts the audio data into electric information, and transmits the electric information to the loudspeaker. The loudspeaker converts the electric information into an acoustic wave audible to the human ear. The audio circuit further receives electric information from the microphone, converts the electric information into audio data, and transmits the audio data to the peripheral interface 108 for further processing. The audio data may be acquired from the memory 102 or by the radio frequency module 110. In addition, the audio data may also be stored in the memory 102 or sent by the radio frequency module 110. In some embodiments, the audio module 116 may further include an earphone jack, for providing an audio interface for an earphone or another device.

The touch screen 118 provides an output and input interface between the terminal device 100 and the user at the same time. Specifically, the touch screen 118 displays a video output to the user, and content of the video output may include text, images, videos, or any combination thereof. Some output results correspond to some user interface objects. The touch screen 118 further receives an input of the user, such as tapping, sliding, or other gesture operations of the user, so that the user interface object responds to the input of the user. The technology for detecting the input of the user may be a resistive touch detection technology, a capacitive touch detection technology, or any other possible touch detection technologies. Specific examples of a display unit of the touch screen 118 include but are not limited to a liquid crystal display and a light-emitting polymer display.

The key module 120 also provides an interface for the user to input information to the terminal device 100, and the user may press different keys to enable the terminal device 100 to perform different functions.

Figure 2:
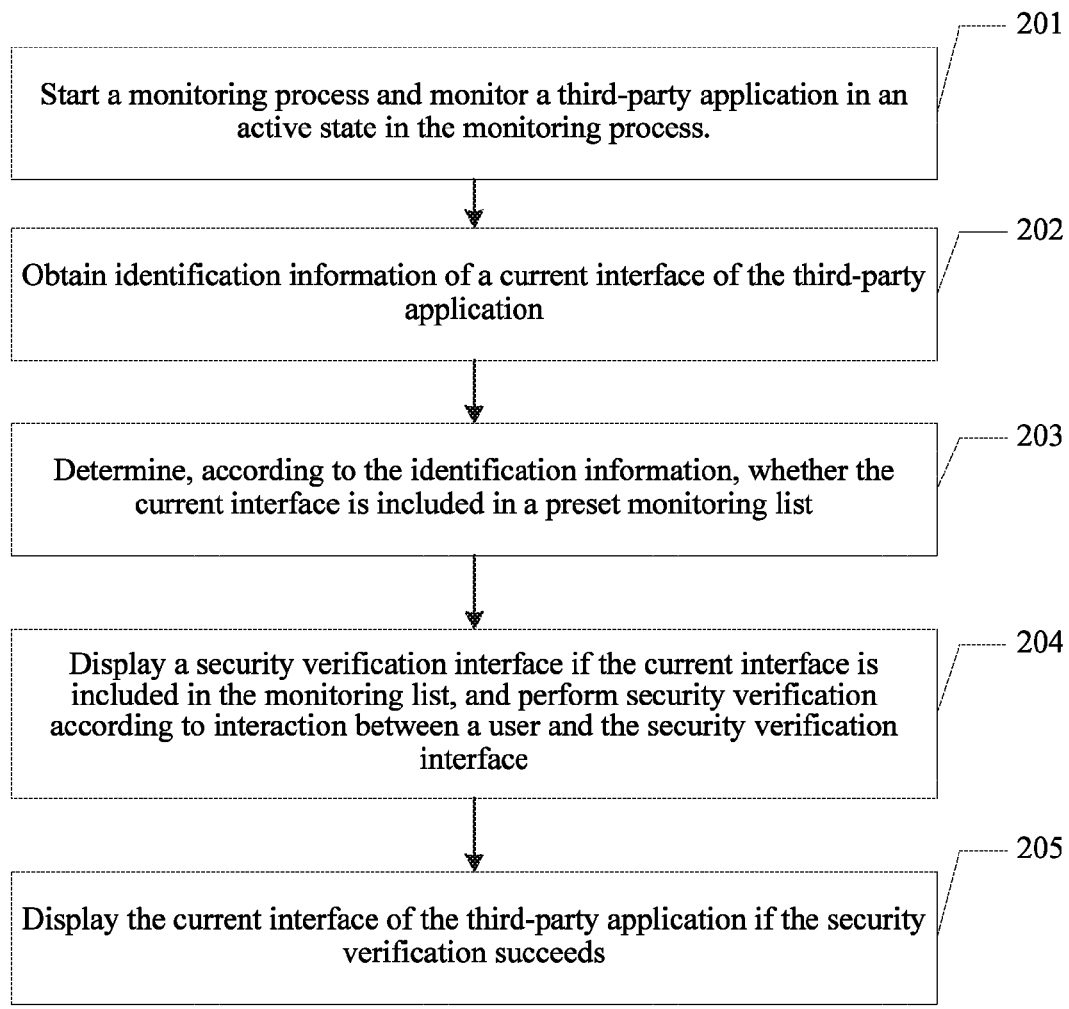
FIG. 2 is a schematic flowchart of a security verification method according to a first embodiment.

Referring to FIG. 2, a first embodiment provides a security verification method, and the method includes:

201: Start a monitoring process and monitor a third-party application in an active state in the monitoring process.

A monitoring process is set in a system, and the monitoring process may be started once the system is started. The monitoring process is used for monitoring all third-party applications in an active state in the system, and the third-party applications include various applications installed in the system, for example, various instant messaging applications including a WeChat client and various management-type applications, including MyApp, used for providing application downloading for users. Being in an active state refers to that the third-party application is in an enabled state, and the third-party application may be started according to an instruction of a user.

202: Obtain identification information of a current interface of the third-party application.

A use situation of the active third-party application is monitored by means of the monitoring process to obtain identification information of a current interface of the active third-party application. The identification information is used for identifying which application the third-party application specifically is and which interface the current interface specifically is.

It should be noted that the current interface is a currently displayed interface. It may be an initial interface displayed when the third-party application is started; or after the third-party application is started, if an interface switching instruction of a user is received, the interface is switched from one interface to another interface, and then, the current interface is the another interface displayed after switching.

Therefore, the obtaining identification information of a current interface of the third-party application not only may be obtaining identification information of a starting interface of the third-party application, but also may be obtaining identification information of a target interface to be switched to when it is detected that the active third-party application performs interface switching according to a user instruction.

For example, the third-party application is WeChat, an initial interface after WeChat is started is a chat interface, and the chat interface is the current interface; when the user instructs to switch to a bankcard interface, the bankcard interface is the current interface.

203: Determine, according to the identification information, whether the current interface is included in a preset monitoring list.

A monitoring list is preset in the system, identification information of an interface for which security verification needs to be performed is stored in the preset monitoring list, the interface for which security verification needs to be performed is an interface containing sensitive information, and the sensitive information refers to data related to a personal financial account, security and privacy, and the like of the user. The interface containing sensitive information specifically may be a payment interface or may be a personal security information interface, for example, a bankcard interface in WeChat, where the bankcard interface includes information related to Tenpay or a credit card and is an interface containing sensitive information.

The identification information of the current interface can identify which interface of which application the current interface specifically is. Whether the current interface of the third-party application is included in the preset monitoring list is determined according to the identification information of the current interface, and if the current interface of the third-party application is included in the preset monitoring list, it indicates that the current interface is an interface for which security verification needs to be performed.

204: Display a security verification interface if the current interface is included in the monitoring list, and perform security verification on a user according to interaction between the user and the security verification interface.

If the current interface is included in the monitoring list, indicating that the current interface is an interface for which security verification needs to be performed, a security verification interface is displayed, where the security verification interface generally only displays necessary information provided for the user to perform security verification, for example, including a password input interface, prompting a user to enter which type of password and specifically which password, and the like, and a user side cannot see the current interface.

Further, security verification is performed according to interaction between the user and the security verification interface, for example, a password entered by the user for entering the interface is obtained, a preset password of the user stored in a database is obtained, comparison is performed to determine whether the password currently entered by the user is the same as the preset password, and the security verification succeeds if the password currently entered by the user is the same as the preset password.

205: Display the current interface of the third-party application if the security verification succeeds.

The current interface of the third-party application is displayed to the user if the security verification succeeds. For example, if a bankcard interface of WeChat is included in the monitoring list, a security verification interface is displayed and security verification is performed according interaction between the user and the security verification interface, and when the user enters a password for entering the bankcard interface and passes the security verification, the bankcard interface of WeChat is displayed to the user.

In this embodiment of the present invention, a monitoring process is started to monitor a third-party application in an active state, and if a current interface of the third-party application in the active state is a interface currently being monitored, a security verification interface is displayed to prompt a user to perform security verification, and the current interface is displayed only if the security verification succeeds, thereby enhancing security for entering the current interface.

Figure 3:
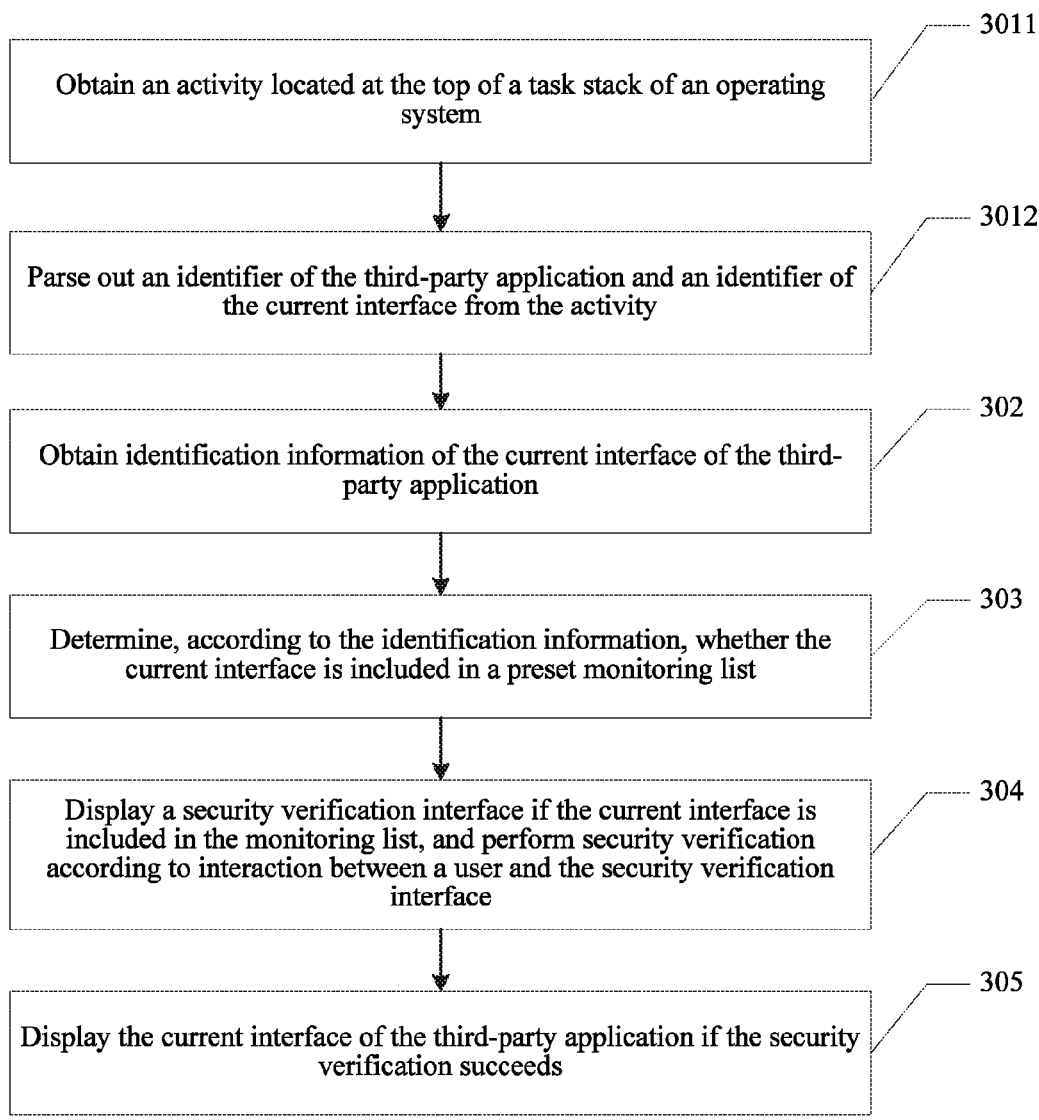
FIG. 3 is a schematic flowchart of a security verification method according to a second embodiment.

Referring to FIG. 3, a second embodiment provides a security verification method. The embodiment shown in FIG. 3 is similar to the embodiment shown in FIG. 2, and the difference lies in that the monitoring a third-party application in an active state in the monitoring process may include steps 3011 and 3012:

3011: Obtain an activity located at the top of a task stack of an operating system.

In an Android operating system, one application includes multiple mutually combined activities. Operating an application by a user means to execute a particular task to complete a particular operation. When a user clicks an icon of an application to enable the application, a task of the application is transferred to the foreground of the mobile terminal for display, and if currently no task of the application exists, the system creates a task and run a main activity in the task, where the main activity is a main interface of the application.

In addition, in the Android operating system, activities are managed by using a stack, every started activity is stored in the stack, and the stack may be referred to as a task stack. Following the basic principle of first-in last-out (FILO), an activity that enters the stack first is located at the bottom of stack and an activity that enters the stack later (that is, an activity that is run later) is pushed on the top of the stack and takes focus to interact with the user.

Therefore, a currently running activity is an activity located at the top of a task stack of an operating system. When the user instructs to enter a current interface, the activity corresponding to the current interface (that is, the latest activity in the system) is located at the top of the task stack of the operating system.

3012: Parse out an identifier of the third-party application and an identifier of the current interface from the activity.

An identifier of the third-party application and an identifier of the current interface are parsed out from the activity located at the top of the task stack of the operating system, where the identifier of the third-party application is a name of a package of the third-party application, and the identifier of the current interface is a name of the current interface.

For example, when the user instructs to enter a bankcard interface of WeChat and an activity corresponding to the bankcard interface is located at the top of the task stack of the operating system, an identifier of WeChat and an identifier of the bankcard interface are parsed out from the activity that corresponds to the bankcard interface. Specifically, it is obtained by parsing that the application package name of WeChat is com.tencent.mm, and the name of the bankcard interface is MallIndexUI. Subsequently, whether the bankcard interface of WeChat is included in the preset monitoring list can be determined according to the specific application package name and interface name, so as to determine whether to perform security verification on the user that enters the bankcard interface, and the bankcard interface of WeChat is displayed only if the security verification succeeds.

Content of steps 302, 303, 304, and 305 in this embodiment is the same as that of steps 202, 203, 204, and 205 in the foregoing embodiment shown in FIG. 2, and the details are not repeatedly described herein.

In this embodiment of the present invention, a monitoring process is started to monitor a third-party application in an active state, and if a current interface of the third-party application in the active state is an interface currently being monitored, a security verification interface is displayed to prompt a user to perform security verification, and the current interface is displayed only if the security verification succeeds, thereby enhancing security for entering the current interface.

Figure 4:
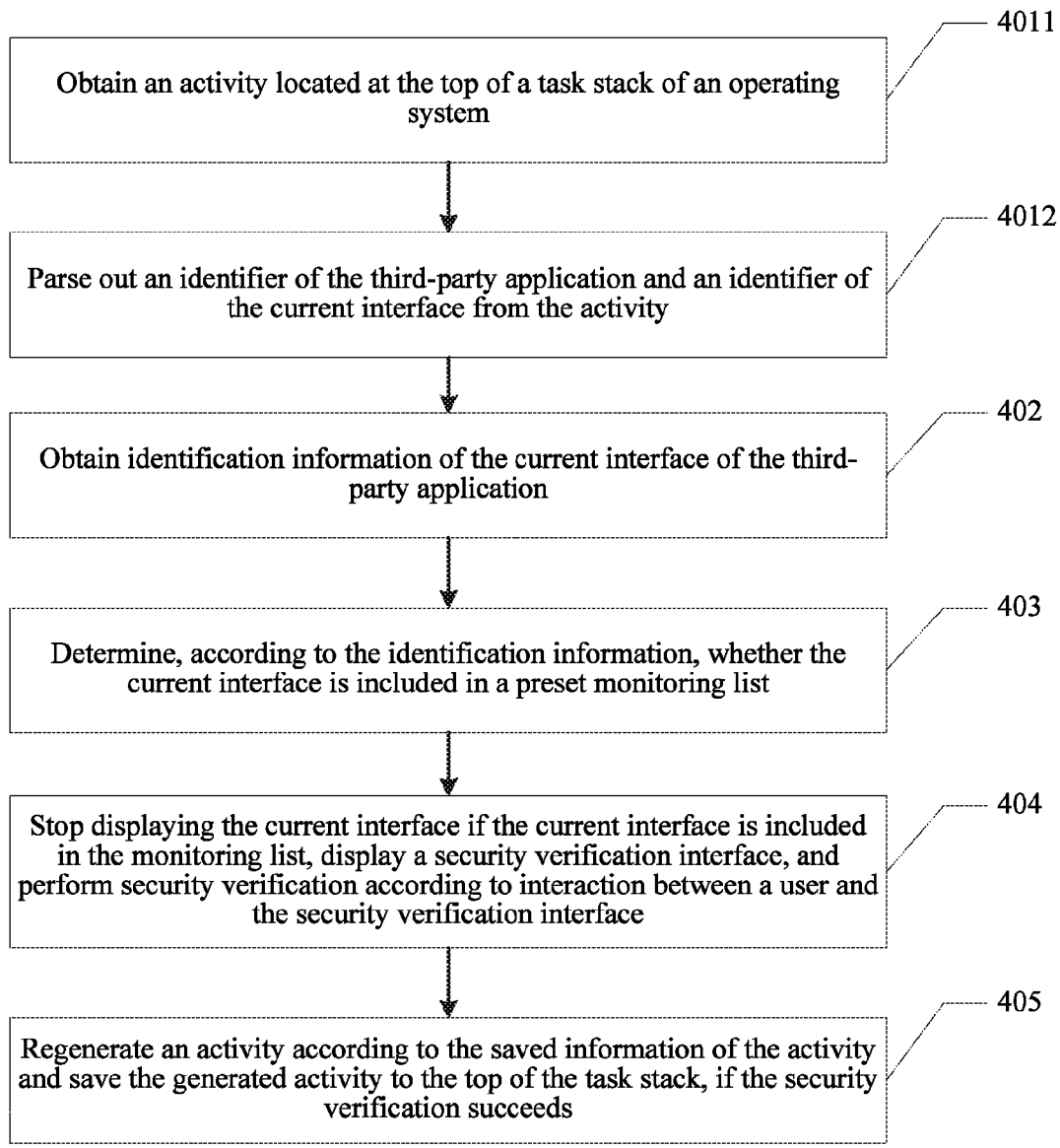
FIG. 4 is a schematic flowchart of a security verification method according to a third embodiment.

Referring to FIG. 4, a third embodiment provides a security verification method. The embodiment shown in FIG. 4 is similar to the embodiment shown in FIG. 3, and the difference lies in that the method further includes: stopping displaying the current interface, if the current interface is included in the monitoring list. Specifically, step 204 of displaying a security verification interface if the current interface is included in the monitoring list and performing security verification on a user according to interaction between the user and the security verification interface may be:

Step 404: Stop displaying the current interface if the current interface is included in the monitoring list, display the security verification interface, and perform security verification according to interaction between the user and the security verification interface.

When the current interface is entered, the system loads and displays the current interface, but if detecting that the current interface is included in the monitoring list, the system stops displaying the current interface and displays a security verification interface instead. Because the three stages of loading and displaying the current interface, stopping displaying the current interface, and displaying a security verification interface are of good continuity and the whole process takes a short time, the user cannot perceive displaying of the current interface with naked eyes and instead, directly see the displayed security verification interface.

In the Android operating system, a specific implementation manner of stopping displaying the current interface is: saving information of the activity located at the stack stop of the task stack of the operating system and popping up the task stack in the activity, if the current interface is included in the monitoring list. In this way, displaying of the current interface is stopped Step 205 of displaying the current interface of the third-party application if the security verification succeeds may specifically be:

Step 405: Regenerate an activity according to the saved information of the activity and save the generated activity to the top of the task stack, if the security verification succeeds.

If the security verification succeeds, the activity is regenerated according to the saved information of the activity that corresponds to the displayed current interface, and the generated activity is saved as a current activity at the top of the task stack. That is, the activity is regenerated according to the information of the activity that corresponds to the current interface and is at the top of the task stack that pops up, and saved to the top of the task stack.

Content of steps 4011, 4012, 402, and 403 in this embodiment is the same as that of steps 3011, 3012, 302, and 303 in the foregoing embodiment shown in FIG. 3, and the details are not repeatedly described herein.

In this embodiment of the present invention, a monitoring process is started to monitor a third-party application in an active state, and if a current interface of the third-party application in the active state is a interface currently being monitored, a security verification interface is displayed to prompt a user to perform security verification, and the current interface is displayed only if the security verification succeeds, thereby enhancing security for entering the current interface.

Figure 5:
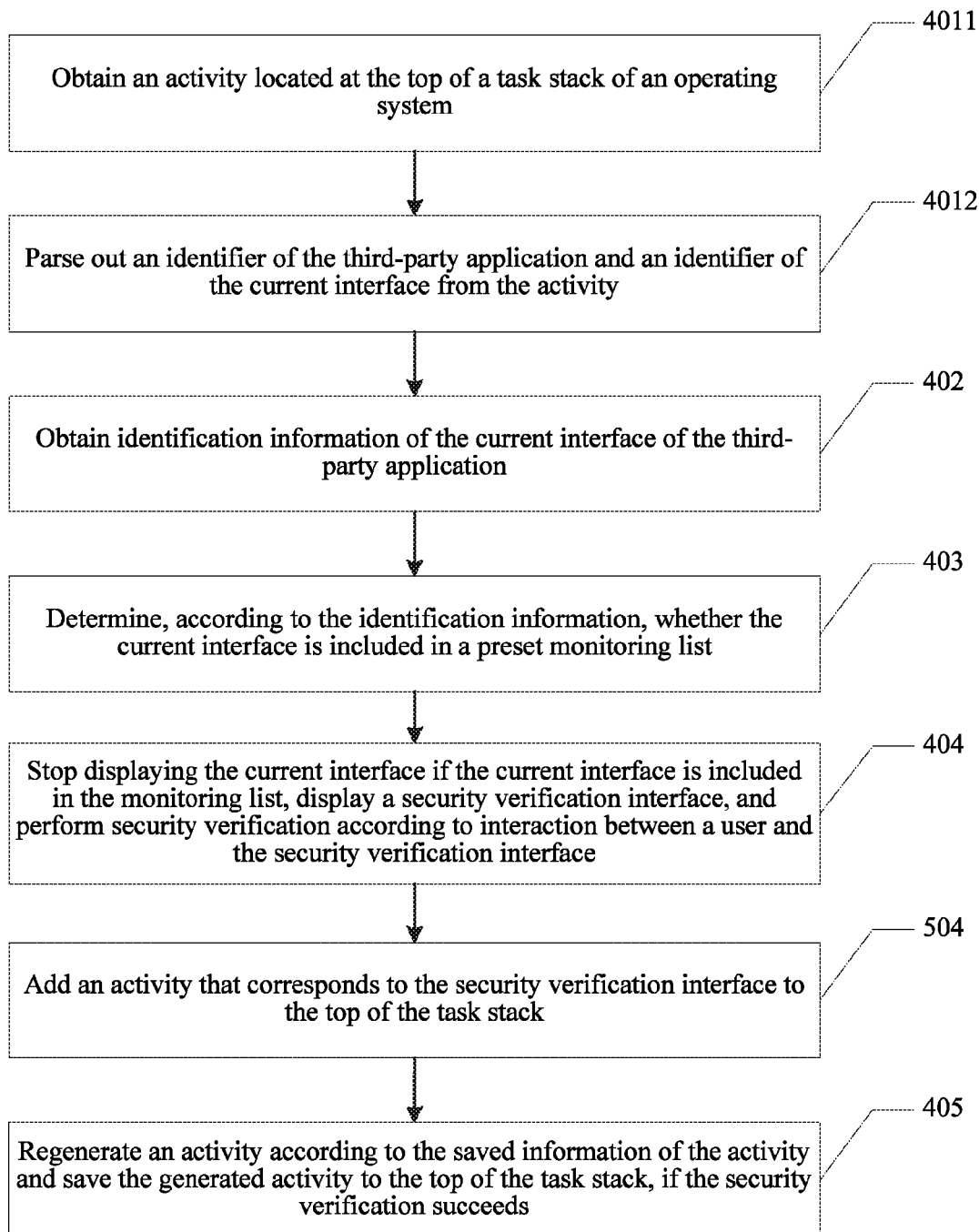
FIG. 5 is a schematic flowchart of a security verification method according to a fourth embodiment.

Referring to FIG. 5, a fourth embodiment provides a security verification method. The embodiment shown in FIG. 5 is similar to the embodiment shown in FIG. 3, and the difference lies in that before step 405 of regenerating an activity according to the saved information of the activity and saving the generated activity to the top of the task stack, the method further includes:

504: Add an activity that corresponds to the security verification interface to the top of the task stack.

An activity that corresponds to the security verification interface is added to the top of the task stack, so as to perform the step of displaying the security verification interface before the current interface is displayed.

In this embodiment of the present invention, a monitoring process is started to monitor a third-party application in an active state, and if a current interface of the third-party application in the active state is an interface currently being monitored, a security verification interface is displayed to prompt a user to perform security verification, and the current interface is displayed only if the security verification succeeds, thereby enhancing security for entering the current interface.

Figure 6:
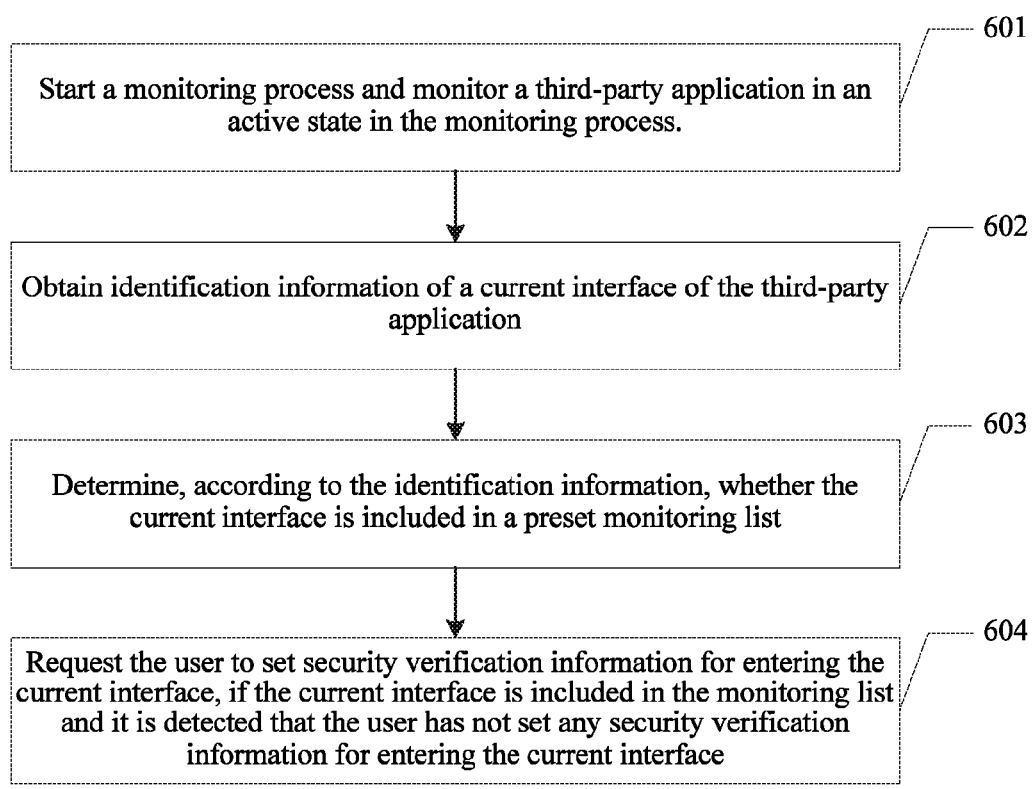
FIG. 6 is a schematic flowchart of a security verification method according to a fifth embodiment.

Referring to FIG. 6, a fifth embodiment provides a security verification method. The embodiment shown in FIG. 6 is similar to the embodiment shown in FIG. 2, and the difference lies in that the method further includes:

604: Request the user to set security verification information for entering the current interface, if the current interface is included in the monitoring list and it is detected that the user has not set any security verification information for entering the current interface.

If the current interface is included in the monitoring list and it is detected that the user has not set any security verification information for entering the current interface, indicating that the user has not set security verification information yet, the user is requested to set security verification information for entering the current interface. Next time when the current interface is entered, security verification is performed by comparing the set security verification information with security verification information that is input by the user.

Further, if the security verification fails, failure of the current security verification and the remaining number of times security verification is allowed to be performed are prompted. Specifically, if the security verification fails after the remaining number of times security verification is allowed to be performed are performed, the user is prompted to perform security verification by using another method. The another method may be entering the current page by using a password the same as that for logging in to the third-party application.

Content of steps 601, 602, and 603 in this embodiment is the same as that of steps 201, 202, and 203 in the foregoing embodiment shown in FIG. 2, and the details are not repeatedly described herein.

In this embodiment of the present invention, a monitoring process is started to monitor a third-party application in an active state, and if a current interface of the third-party application in the active state is a interface currently being monitored, a security verification interface is displayed to prompt a user to perform security verification, and the current interface is displayed only if the security verification succeeds, thereby enhancing security for entering the current interface.

Figure 7:
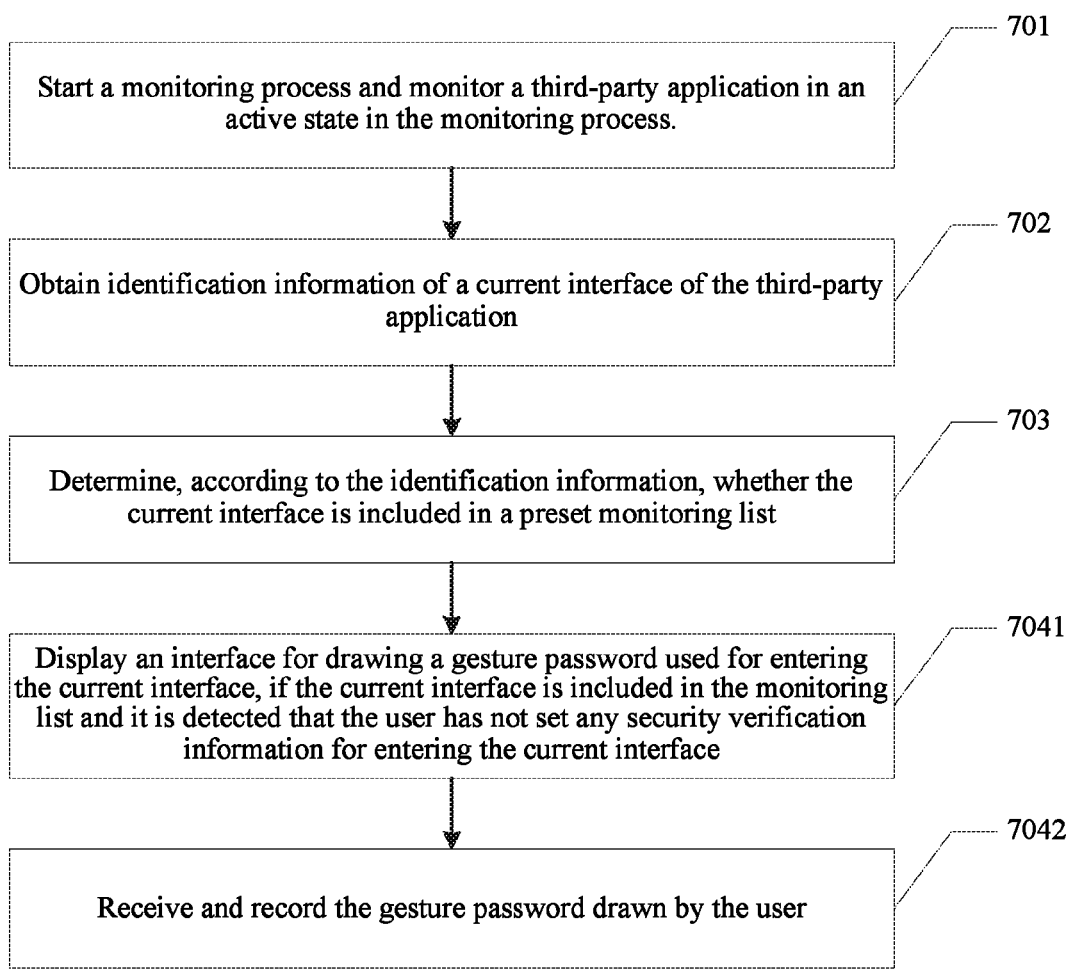
FIG. 7 is a schematic flowchart of a security verification method according to a sixth embodiment.

Referring to FIG. 7, a sixth embodiment provides a security verification method. The embodiment shown in FIG. 7 is similar to the embodiment shown in FIG. 6, and the difference lies in that, specifically, step 604 of requesting the user to set security verification information for entering the current interface specifically includes steps 7041 and 7042:

7041: Display an interface for drawing a gesture password used for entering the current interface.

Figure 8:
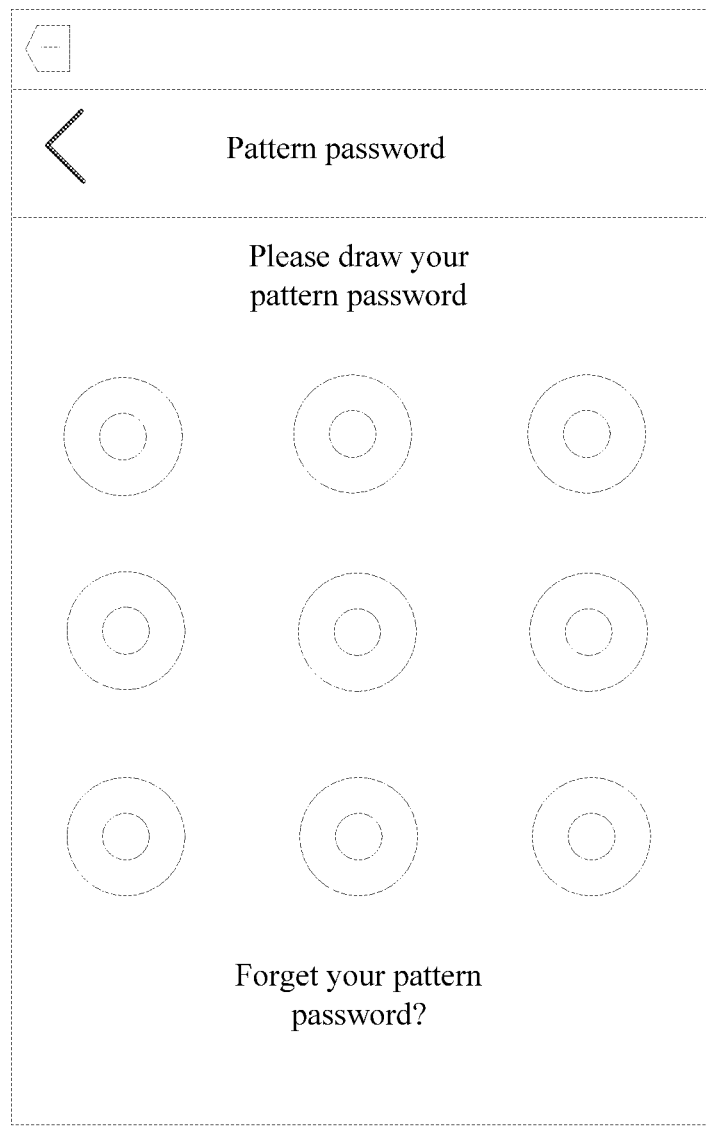
FIG. 8 is a schematic diagram of an interface for setting a gesture password.

As shown in FIG. 8, an interface for drawing a gesture password used for entering the current interface is displayed to the user.

7042: Receive and record the gesture password drawn by the user.

The gesture password drawn by the user is received and recorded in the system, so that next time the user switches to the current interface, the gesture password can be used to perform security verification on the user.

Content of steps 701, 702, and 703 in this embodiment is the same as that of steps 201, 202, and 203 in the foregoing embodiment shown in FIG. 2, and the details are not repeatedly described herein.

In this embodiment of the present invention, a monitoring process is started to monitor a third-party application in an active state, and if a current interface of the third-party application in the active state is a interface currently being monitored, a security verification interface is displayed to prompt a user to perform security verification, and the current interface is displayed only if the security verification succeeds, thereby enhancing security for entering the current interface.

In an example, the Android operating system starts a monitoring process and monitors a third-party application in an active state in the monitoring process, and if a user enables a WeChat client, the third-party application in the active state include the WeChat client. When it is detected that the user enters a bankcard interface of the WeChat client, identification information of the current interface, i.e., the bankcard interface, is obtained, that is, an application package name and an interface name of the bankcard interface are obtained; whether the bankcard interface that the user enters is included in the preset monitoring list is determined by comparing the application package name and interface name with data in a database; and if the bankcard interface that the user enters is included in the preset monitoring list, a security verification interface is displayed and security verification is performed according to interaction between the user and the security verification interface. A specific process includes: entering, by the user, a gesture password in the security verification interface and comparing the gesture password with a gesture password preset by the user for entering the bankcard interface; and if the two are same, indicating that the security verification is passed, displaying the bankcard interface to the user in the WeChat client; or if the two are different, prompting the user that the security verification fails and prompting the user that a remaining number of times security verification is allowed to be performed is 2, prompting the user whether the user forgets the gesture password if the user further inputs incorrect gesture passwords twice, and if the user selects that the gesture password is forgotten, prompting the user to enter the bankcard interface by entering another password.

Figure 9:
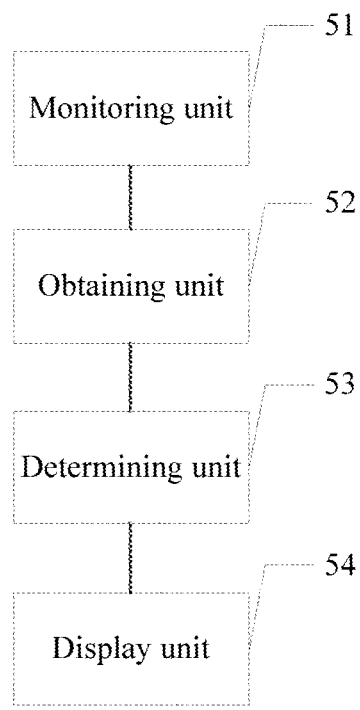
FIG. 9 is a schematic diagram of a security verification apparatus according to a seventh embodiment.

Referring to FIG. 9, a seventh embodiment provides a security verification apparatus applicable to the mobile terminal shown in FIG. 1, and the security verification apparatus includes a monitoring unit 51, an obtaining unit 52, a determining unit 53, and a display unit 54.

The monitoring unit 51 is configured to start a monitoring process and monitor a third-party application in an active state in the monitoring process.

The obtaining unit 52 is configured to obtain identification information of a current interface when it is detected that the third-party application switches an interface.

The determining unit 53 is configured to determine, according to the identification information, whether the current interface of the third-party application is included in a preset monitoring list.

The display unit 54 is configured to display a security verification interface if the current interface is included in the monitoring list, and perform security verification on a user according to interaction between the user and the security verification interface.

The display unit 54 is further configured to display the current interface of the third-party application if the security verification succeeds.

For processes in which the units in this embodiment of the present invention implement their respective functions, refer to detailed content of the foregoing embodiment shown in FIG. 2, and the details are not repeatedly described herein.

In this embodiment of the present invention, a monitoring process is started to monitor a third-party application in an active state, and if a current interface of the third-party application in the active state is an interface currently being monitored, a security verification interface is displayed to prompt a user to perform security verification, and the current interface is displayed only if the security verification succeeds, thereby enhancing security for entering the current interface.

Figure 10:
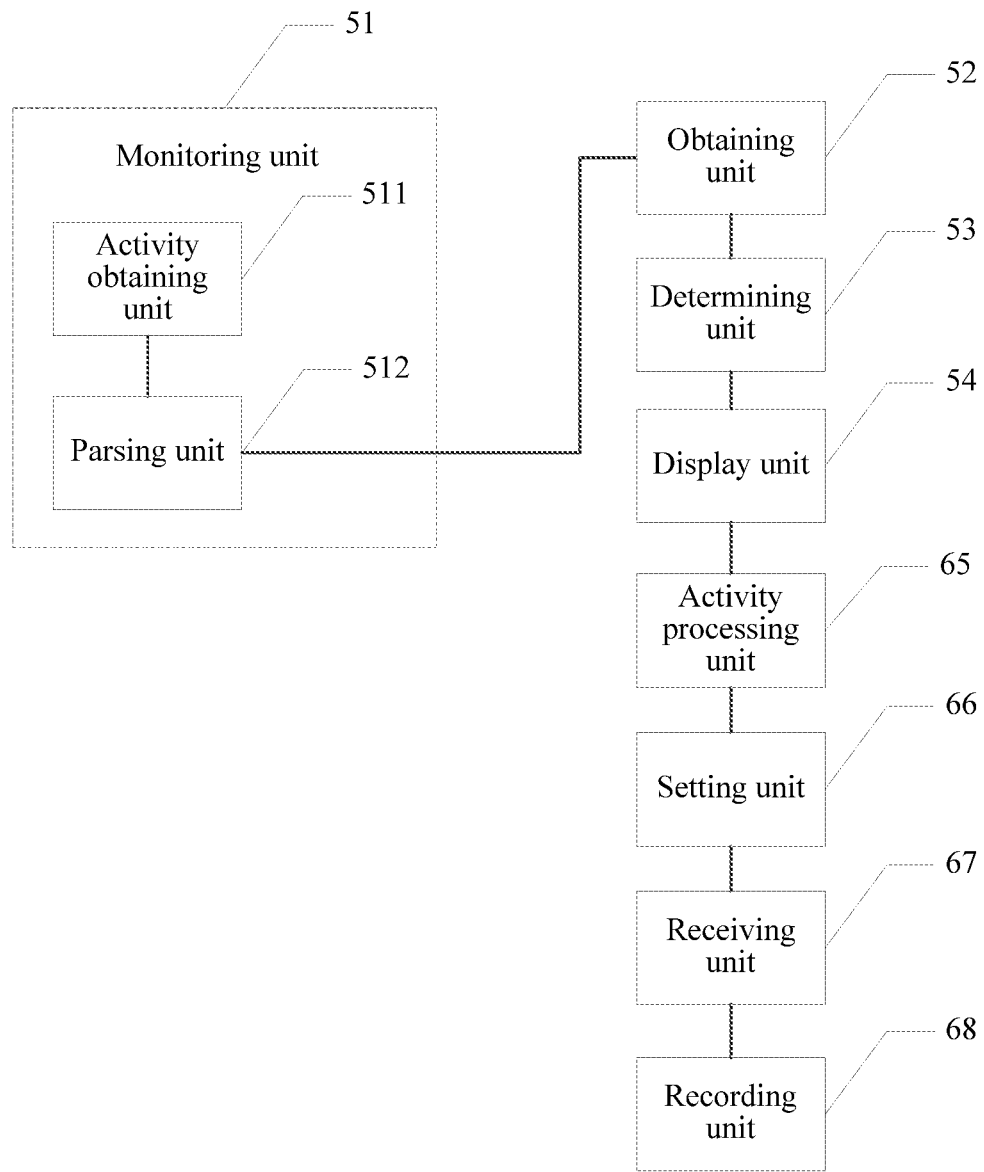
FIG. 10 is a schematic diagram of a security verification apparatus according to an eighth embodiment.

Referring to FIG. 10, an eighth embodiment provides a security verification apparatus applicable to the mobile terminal shown in FIG. 1 and is similar to the embodiment shown in FIG. 9, and the difference lies in that the security verification apparatus in this embodiment further includes: an activity obtaining unit 511, a parsing unit 512, an activity processing unit 65, a setting unit 66, a receiving unit 67, and a recording unit 68.

Specifically, the monitoring unit 51 further includes:

the activity obtaining unit 511, configured to obtain an activity located at the top of a task stack of an operating system; and the parsing unit 512, configured to parse out an identifier of the third-party application and an identifier of the current interface from the activity.

Moreover, the display unit 54 is further configured to stop displaying the current interface, if the current interface is included in the monitoring list.

Furthermore, the apparatus further includes:

the activity processing unit 65, configured to save information of the activity and pop up the task stack in the activity, if the current interface is included in the monitoring list.

The activity processing unit 65 is further configured to regenerate an activity according to the saved information of the activity and save the generated activity to the top of the task stack, if the security verification succeeds.

The activity processing unit 65 is further configured to add an activity that corresponds to the security verification interface to the top of the task stack.

Furthermore, the apparatus further includes:

the setting unit 66, configured to request the user to set security verification information for entering the current interface, if the current interface is included in the monitoring list and it is detected that the user has not set any security verification information for entering the current interface;

the display unit 54 being further configured to display an interface for drawing a gesture password used for entering the current interface;

the receiving unit 67, configured to receive the gesture password drawn by the user; and the recording unit 68, configured to record the gesture password drawn by the user.

For processes in which the units in this embodiment of the present invention implement their respective functions, refer to detailed content of the foregoing embodiments shown in FIG. 3 to FIG. 7, and the details are not repeatedly described herein.

In this embodiment of the present invention, a monitoring process is started to monitor a third-party application in an active state, and if a current interface of the third-party application in the active state is an interface currently being monitored, a security verification interface is displayed to prompt a user to perform security verification, and the current interface is displayed only if the security verification succeeds, thereby enhancing security for entering the current interface.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

A person of ordinary skill in the art may understand that all or some of the steps of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The sequence numbers of the above embodiments of the disclosure are only for the purpose of description, and do not represent one embodiment is superior to another.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A security verification method, comprising:

starting a monitoring process and monitoring a third-party application in an active state in the monitoring process;

obtaining identification information of a current interface of the third-party application;

determining, according to the identification information, whether the current interface is comprised in a preset monitoring list;

displaying a security verification interface if the current interface is comprised in the monitoring list, and performing security verification on a user according to interaction between the user and the security verification interface; and displaying the current interface of the third-party application if the user passes the security verification;

wherein the monitoring a third-party application in an active state in the monitoring process comprises:

obtaining an activity located at the top of a task stack of an operating system; and parsing out an identifier of the third-party application and an identifier of the current interface from the activity.

2. The method according to claim 1, wherein the method further comprises:

stopping displaying the current interface, if the current interface is comprised in the monitoring list.

3. The method according to claim 1, wherein the method further comprises:

saving information of the activity and popping up the task stack in the activity, if the current interface is comprised in the monitoring list.

4. The method according to claim 3, wherein the method further comprises:

regenerating an activity according to the saved information of the activity and saving the generated activity to the top of the task stack, if the security verification succeeds.

5. The method according to claim 4, before the regenerating an activity according to the saved information of the activity and saving the generated activity to the top of the task stack, further comprising:

adding an activity that corresponds to the security verification interface to the top of the task stack.

6. The method according to claim 1, wherein the method further comprises:

requesting the user to set security verification information for entering the current interface, if the current interface is comprised in the monitoring list and it is detected that the user has not set any security verification information for entering the current interface.

7. The method according to claim 6, wherein the requesting the user to set security verification information for entering the current interface comprises:
displaying an interface;
receiving a gesture password drawn by the user on the interface, wherein the gesture password is used for entering the current interface; and
receiving and recording the gesture password drawn by the user.

8. A security verification apparatus, comprising:
a monitoring unit, configured to start a monitoring process and monitor a third-party application in an active state in the monitoring process;
an obtaining unit, configured to obtain identification information of a current interface of the third-party application;
a determining unit, configured to determine, according to the identification information, whether the current interface is comprised in a preset monitoring list; and
a display unit, configured to display a security verification interface if the current interface is comprised in the monitoring list, and perform security verification on a user according to interaction between the user and the security verification interface,
the display unit being further configured to display the current interface of the third-party application if the user passes the security verification;
wherein the monitoring unit comprises:
an activity obtaining unit, configured to obtain an activity located at the top of a task stack of an operating system; and
a parsing unit, configured to parse out an identifier of the third-party application and an identifier of the current interface from the activity.

9. The apparatus according to claim 8, wherein:
the display unit is further configured to stop displaying the current interface, if the current interface is comprised in the monitoring list.

10. The apparatus according to claim 8, wherein the apparatus further comprises:
an activity processing unit, configured to save information of the activity and pop up the task stack in the activity, if the current interface is comprised in the monitoring list.

11. The apparatus according to claim 10, wherein:
the activity processing unit is further configured to regenerate an activity according to the saved information of the activity and save the generated activity to the top of the task stack, if the security verification succeeds.

12. The apparatus according to claim 11, wherein:
the activity processing unit is further configured to add an activity that corresponds to the security verification interface to the top of the task stack.

13. The apparatus according to claim 12, wherein the apparatus further comprises:
a setting unit, configured to request the user to set security verification information for entering the current interface, if the current interface is comprised in the monitoring list and it is detected that the user has not set any security verification information for entering the current interface.

14. The apparatus according to claim 13, wherein:
the display unit is further configured to display an interface and receive a gesture password drawn by the user on the interface, wherein the gesture password is used for entering the current interface.

15. The apparatus according to claim 14, wherein the setting unit comprises:
a receiving unit, configured to receive the gesture password drawn by the user; and
a recording unit, configured to record the gesture password drawn by the user.

* * * * *